BIDIRECTIONAL DESKEWER UTILIZING A DELAY LINE WITH TWO INPUTS

Filed Nov. 27, 1963 2 Sheets-Sheet 1

INVENTOR.
Sung Pal Chur
BY
Robert G. Clay
Attorneys

Oct. 24, 1967 SUNG PAL CHUR 3,349,383

BIDIRECTIONAL DESKEWER UTILIZING A DELAY LINE WITH TWO INPUTS

Filed Nov. 27, 1963 2 Sheets-Sheet 2

INVENTOR.
Sung Pal Chur
BY
Robert G. Clay
Attorneys

United States Patent Office 3,349,383
Patented Oct. 24, 1967

3,349,383

BIDIRECTIONAL DESKEWER UTILIZING A DELAY LINE WITH TWO INPUTS

Sung Pal Chur, Inglewood, Calif., assignor to Ampex Corporation, Redwood City, Calif., a corporation of California Filed Nov. 27, 1963, Ser. No. 326,490
7 Claims. (Cl. 340—174.1)

ABSTRACT OF THE DISCLOSURE

A deskewing circuit for a bidirectionally driven magnetic tape transport including preamplifier means receiving data signals; delay line means including a pair of individual variably positioned tap means and a single output terminal, each tap means receiving signals from the preamplifier means; gating means controllable in accordance with the direction of the transport and coupled to the tap means for providing signals from the preamplifier means to one of the two tap means in accordance with the direction of the transport.

Figure 1:
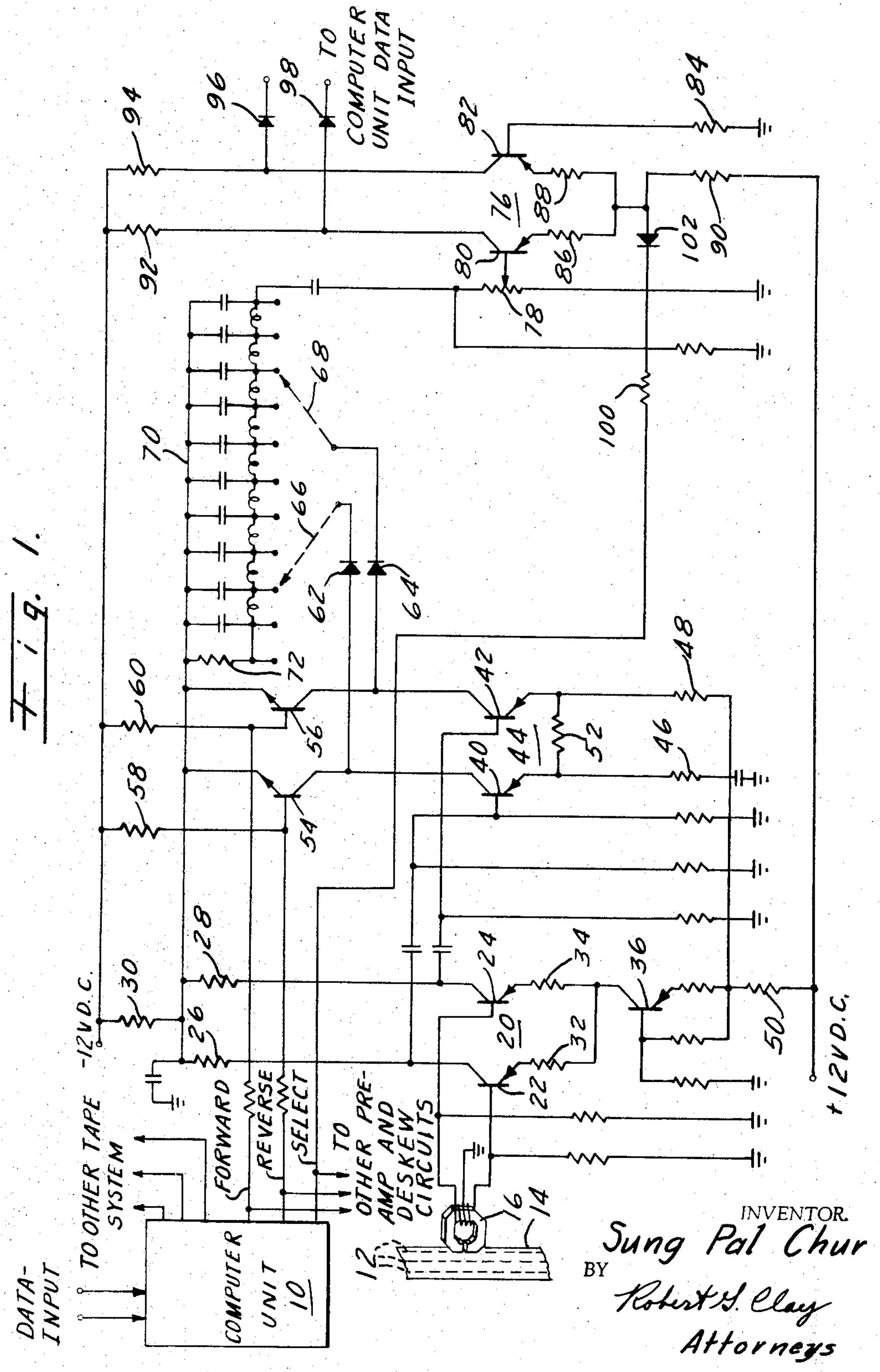

This invention relates to digital data processing systems, and more particularly to a system for reproducing digital data from parallel tracks in a magnetic tape storage system.

Magnetic tape systems are widely used as high capacity memories for digital data processing systems because by their use vast amounts of data may be stored at relatively low cost, but with high reliability. In order to be compatible with the high data rate capability of most data processor units, the magnetic tape transport should be able to record and reproduce digital data at comparable if not equal rates. To this end, data is usually recorded at high bit densities, such as 200, 556 or 800 binary digits (bits) per linear inch of tape and the tape is moved at high speed, such as 75 inches per second or more. Also, a number of bits are usually recorded in parallel on a number of tracks on the tape to represent individual binary characters, symbols and numbers in a form suitable for direct usage in the data processor. However, the high bit densities and high data rates must both be achieved without decreasing the reliability with which the data may be reproduced with the needed accuracy.

With the use of high bit densities in a multi-track recording, a serious "static skew" problem is virtually impossible to avoid. Extremely minute differences in the alignment of the recording and the reproducing heads will, at high bit densities and high tape speeds, result in a relatively large time displacement between reproduced parallel bits in different tracks. Static skew is to be distinguished from dynamic skew, which results from deviation of the tape from its true path during movement.

Presently, means are known for minimizing static skew, so as to keep parallel pulses in substantial time coincidence with each other. This may be accomplished by the incorporation of delay elements in the reproducing circuitry to selectively delay the data bits from each track so that they are shifted into the proper parallel time relationship with one another. However, static skew errors are reversed for opposite directions of tape movement because the previously leading transducer now becomes the trailing transducer. Many digital tape transport systems are designed to operate bidirectionally in transfer of data to and from a data processing system. Therefore, delay elements used to compensate for static skew must be provided for both directions of operation.

Providing different delay elements for each direction of operation for each separate track of a number of different multi-track tape transports, however, would materially increase the cost of an overall system and incidentally increase the probability of component failures. In a previously filed United States patent application, Ser. No. 218,260, of Charles E. Mendenhall and Sung P. Chur, entitled, "Signal Coupling Systems for Digital Reproducing Systems," filed Aug. 21, 1962, and assigned to the assignee of the present invention, and now United States Patent 3,275,990, a system is described for providing bidirectional deskewing of parallel bits by use of a single delay line for each data track. In accordance with the previous invention, the single delay line element is operated to accomplish automatically the necessary degree of deskewing, once it is adjusted, for each data channel in either direction of tape movement. After preamplification, the signals reproduced in each channel are coupled to the central tap of a multi-tap delay line having output terminals at each end. The central tap is set to compensate for head misalignment in the given channel for one direction of tape movement, and also serves without further setting for the opposite direction. The delayed output signals are then taken from a selected one of the output terminals of the delay line, as determined by whether the tape is being driven in the forward or in the reverse direction.

However, the deskewing circuit described in the above-mentioned patent application requires two double-ended difference amplifiers, each being coupled to receive output signals from a different output terminal of the delay line. Then, depending upon the direction, one of the difference amplifiers provides the data pulses in the form of low level variations of current flow into output conductors. While the circuit of the previous invention accomplishes bidirectional static deskewing with single delay lines for each channel, certain problems may arise in providing proper impedance matching at each end of the delay line so as to prevent signal reflections and mutual interference of the signals. Also, gating of the signal to one of the two difference amplifiers at the output side of the delay line may result in signal distortion during the switching interval and the introduction of signal transients in the output signals.

Therefore, it is an object of the present invention to provide an improved preamplifying and deskewing circuit for use in multi-track tape transport storage systems.

Another object of the present invention is to provide an improved bidirectional static deskewing circuit which employs a single delay line having a single output terminal.

A further object of the present invention is to provide an improved bidirectional deskewing system which is substantially free of disturbances arising from signal reflections in the delay line, and from signal distortions and transients arising during gating.

Yet another object of the present invention is to provide an improved preamplifying and deskewing circuit for use in a system for coupling reproduced data signals from a number of multi-track tape transport systems to a single centrally located data processing unit efficiently, reliably and with low cost.

These and other objects of the present invention are realized by a system which employs a single delay line element for static deskewing in each channel in a manner which automatically accommodates the delay interval to the particular direction of tape movement, and has only a single output terminal at one end thereof. The single delay line has two input taps, one for each direction of tape travel. After preamplification, the data signals are provided as two independent driving signals from separate current sources of virtually infinite impedance to each of the two input taps through separate diode paths. Depending upon the direction of tape travel, one of the diodes is reverse biased by a control signal to isolate the two input taps from each other. A single differential amplifier is coupled to the single output terminal of the delay line to amplify the delayed data signals. The other end of the delay line may be appropriately terminated to prevent signal reflections and interference due to impedance mismatch. With this circuit arrangement, signal gating is effected at the input side of the delay line under the control of forward and reverse control signals in such manner that distortions and transients due to switching and impedance changes are virtually eliminated at the output side.

Figure 2:
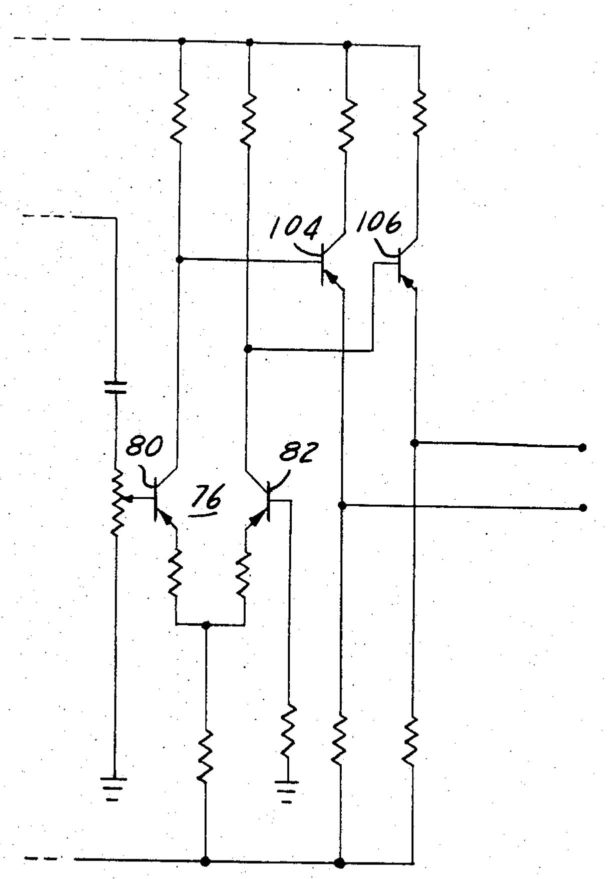

A better understanding of the invention may be had by reference to the following description, taken in conjunction with the accompanying drawings, in which:

FIG. 1 is a schematic diagram of a preamplifier, deskewing and selector circuit in accordance with the invention, which may be employed in a multi-track data storage system with a magnetic tape transport; and, FIG. 2 is a schematic circuit diagram illustrating alternative output and selection circuitry for the preamplifying, deskewing and selection circuit of FIG. 1.

Referring now to FIG. 1, which illustrates one manner in which circuits in accordance with the invention may be employed in data processing systems, a typical system for processing high volume of business or other statistical data includes a single central computer unit 10, which may be coupled to any number of bidirectional tape transport storage systems, as illustrated and explained more fully in the previously mentioned copending patent application. Each tape storage unit (only one of which is illustrated partially herein) includes a multi-head transducer for reproducing signals recorded in the parallel tracks 12 on the tape 14. The multi-head transducer contains a separate magnetic reproducing head 16 for each of the parallel tracks, the different heads of the multi-head assembly being physically aligned as closely as possible with one another in a transverse line across the tape. Tape guide and bidirectional advance mechanisms for the tape 14 may be conventional and have therefore not been shown herein in order to simplify the illustration.

Each head 16 at each of the tape transports is coupled to provide input signals to an associated data signal channel. Each signal channel contains a separate preamplifier, deskew and selection circuits so that reproduced data signals may be applied from the selected multi-track tape transport at a selected magnitude and in proper parallel time relationship to the computer unit 10.

The data signals from the separate tracks of a selected tape transport system are entered into the respective parallel channels of the data processing system in substantial parallelism. These signals, however, may vary from true parallelism in time relative to each other by an amount depending upon the degree of heat displacement, as previously mentioned. Thus, each of the separate channels must be able to provide a unique deskewing time correction for the data signals provided to the channel. In addition, the amount of time displacement must be adjustable inasmuch as head wear may require replacement of a recording or reproducing head assembly. Static skew must be compensated for in both the forward and reverse directions of tape movement even though the effect of skewing is different for the two directions.

Control signals from the computer unit 10 to each of the tape transports determine which tape transport is to be used and which direction (forward or reverse) of tape movement is to be employed. In contrast with the previous system described in the aforementioned copending patent application, a separate selection control signal from the computer unit 10 may be used to govern the coupling of the parallel signal channels in the desired tape transport system to the computer unit 10. As previously mentioned, the data signals from the tape 12 are deskewed at circuitry associated with the particular tape transport unit and are delivered as parallel low level amplified signals to the computer unit 10. At the computer unit 10, a common set of amplifiers and associated circuits are supplied for providing data pulses for use in the data processing circuits of the computer.

The preamplifying, deskewing and selection circuit illustrated in FIG. 2 employs transistor circuits, the transistors being of particular conductivity types although it should be evident to those skilled in the art that transistors of opposite conductivity types may be used with appropriate reversal of power supply voltage polarities, or that comparable vacuum tube devices may alternately be used. Supply voltages for the operation of the transistor circuits are obtained from a −12 volt DC supply and a +12 volt DC supply, and common connections are made at a ground point established at a potential midway therebetween.

Input signals to the circuit, which are recorded on the tape in a "non-return to zero" (NRZ) code format, are derived directly from the sensing coil on the magnetic head 16, which is connected at either end through a pair of input terminals. As is well known, the NRZ signals provide positive-going and negative-going pulses to distinguish between the "zero" and "one" binary states. The pulses as reproduced are usually considerably rounded in waveform because of the high frequency filtering action of the inductive head circuits and may be of a relatively low amplitude. The reproduced signals occurring at each of the input terminals are directly out of phase since they are coupled to opposite ends of the head sensing coil having a center tap referenced at a ground potential; alternatively, the signal derived from the head sensing coil may be applied to a conventional phase splitter circuit to obtain data signals of opposite phase.

The out-of-phase signals are coupled through the deskewing, preamplifying and selection circuitry to the common data input circuitry within the computer unit 10. It must be understood that, while the circuitry illustrated in FIG. 2, is for a single channel of a single tape transport, a similar circuit is provided for each channel of each tape transport.

The out-of-phase input signals are first applied from the input terminals to a dobule-ended first differential amplifier 20, which employs a pair of differentially coupled PNP type transistors 22 and 24. The base terminals of the transistors 22 and 24 receive the oppositely-going input signals. The collectors of the transistors 22 and 24 are coupled through like resistors 26 and 28 and a common resistor 30 to the negative polarity source. Similarly, the emitter terminals of the transistors 22 and 24 are connected through equal resistors 32 and 34 and a common transistor 36 to the +12 volt supply. Accordingly, the emitter currents of both transistors 22 and 24 are drawn from the positive supply voltage through the collector circuit of the transistor 36, which is coupled in a grounded base configuration and accordingly functions as a constant current source. Accordingly, the collector current of the transistor 36 remains substantially constant despite common mode line variations. The collector currents of the two transistors 22 and 24 of the differential amplifier 20 are substantially equal in the absence of an input signal, but become unequal when the input signals are applied.

Amplified data output signals taken from the collector terminals of the transistors 22 and 24 are capacitively coupled to the base terminals of different ones of a pair of transistors 40 and 42, respectively, which are connected as a second differential amplifier 44. The emitter terminals of the transistors 40 and 42 are connected through equal resistors 46 and 48 and a common resistor 50 to the positive voltage supply, while a small transistor 52, having a resistance value of the order of twenty times less than the value of the resistors 46 or 48, is used to couple the emitters together. The combination of the resistors 46, 48 and 52 cooperates to provide what is essentially a common emitter resistor for the differential amplifier circuit 44, while also providing a slight degree of negative feedback for amplifier stability.

The collectors of the transistors 40 and 42 are connected through respective gating NPN type transistors 54 and 56 to the negative supply voltage. The base terminals of the gating transistors 54 and 56 are coupled to receive negative polarity reverse and forward control signals, respectively. Both of these transistors 54 and 56 would be normally biased into a saturated conducting state by the voltage drop across a pair of resistors 58 and 60, thereby short circuiting the output current from the collectors of the transistors 40 and 42. When a negative control signal from the computer 10 is applied to one of the base terminals, the transistor 54 or 56 receiving the control signal becomes non-conducting.

The collector terminals for the transistors 40 and 42 are each connected through a diode 62 and 64, respectively, to one of two separate tap selector switches 66 and 68 to provide driving signals to selected taps on a delay line 70. The delay line 70 is a multi-tap, multi-element delay unit having a plurality of tap points arranged to be contacted by either one of the tap selector switches 66 or 68 to receive the delay line driving signal. The delay line has, for example, eleven tap points at the junctions between the ten equal delay line sections. The delay line 70 is coupled at one end to a precision terminating resistor 72 of a value equal to the characteristic impedance of the line. The other end of the line 50 forms the output terminal of the delay line.

The total length of the delay line 70 in terms of the time of delay is in the microsecond region, normally 3–5 microseconds for the tape speeds commonly used. The tap selectors 66 and 68 may be connected to any of the taps an equal distance away from the center tap, as needed to bring the pulses from the associated head 16 into proper parallel time relation with the pulses from the remaining parallel heads. The tap selectors are originally offset from the middle tap with respect to the amount of relative misalignment of its associated magnetic head 16 to compensate for the time error produced in data pulses in the associated channel. For example, if one of the heads 16 only is misaligned with respect to the others, all of the other delay lines have their tap selectors set at the middle tap. On the other hand, the delay line 70 coupled to the one misaligned head would have its tap selectors 66 and 68 set on either side of this middle tap by an appropriate amount, since the time compensation needed relative to the midpoint vary in complementary fashion for the two directions of tape movement.

For a better understanding of the operation, assume that a forward control signal is applied by the computer unit 10 to the base of the gating transistor 56 to bias it to non-conduction. At the same time, the transistor 54 remains saturated so that all of the current flowing through the transistor 40 flows through the transistor 54. The diode 62 is now reverse biased, thus uncoupling the collector output terminal of the transistor 40 from the delay line. The diode 64, on the other hand, is forward biased because of the non-conducting transistor 56 to couple the collector terminal of the transistor 42 to the tap selector 68. The collector current of the transistor 42 then must flow through the diode 64 to the selected delay line tap 68. The amplified pulses are then delayed in the delay line 70 in an amount appropriate for the forward direction when reaching the output terminal of the delay line 70.

On the other hand, when a negative reverse control signal is applied to the base of the transistor 54, the transistor 54 becomes non-conducting, with transistor 56 being saturated. This forward biases the diode 62 and back biases the diode 64 so that the collector current of the transistor 40 is delivered to the tap selector 66. The forward and reverse control signals from the computer unit 10 should be applied in complementary fashion, that is, either the forward or the reverse control signal should exist at all times, to prevent amplifier overloading and switching recovery problems.

The output terminal of the delay line 70 is capacitively coupled to the input of the differential amplifier 76 through a potentiometer 78, which has a movable tap for controlling the gain. A pair of PNP type transistors 80 and 82 are coupled in typical differential amplifier fashion with the base of the transistor 80 being connected to the tap on the potentiometer 78 and the base of the transistor 82 connected through a resistor 84 to ground potential. The emitters of the transistors 80 and 82 are connected through like resistors 86 and 88 and a common emitter resistor 90 to the positive voltage supply, while the collector terminals are coupled through like resistors 92 and 94 to the negative voltage supply. The output signals from each half of the differential amplifier 76 are passed through output diodes 96 and 98 coupled at the collector terminals, to pass the data pulses in the form of low level differential current variations to the data input terminals of the computer unit 10.

Tape transport selection control signals are applied from the computer unit 10 through a resistor 100 and a diode 102 to the emitter terminals of the transistors 80 and 82 in the differential amplifier 76. The selection signals are applied as either a positive or a negative voltage level, the positive signal allowing the differential amplifier 76 to operate to provide the output signal to the computer unit 10 and the negative voltage level being effective to apply a negative voltage to the emitter terminal of the transistors 80 and 82 to bias them to non-conduction.

Alternatively, as shown in FIG. 2, the collector outputs from the differential amplifier 76 may be used to drive the pair of transistors 104 and 106, which are connected in typical emitter follower fashion to provide the output signals to the data input terminals of the computer unit 10. In this case, a separate selection control signal need not be provided in that this function may be carried out in the data input circuitry at the computer unit 10. The alternative use of the emitter followers instead of the diodes 96 and 98 produces a more effective circuit decoupling between the differential amplifier 76 and the data input terminals to the computer 10.

A better appreciation of the invention may be had by noting certain advantages over the prior art. In the first place, the delay line 70 is driven by a differential amplifier current source of virtually infinite impedance, thus easing the problem of proper line termination to prevent signal reflections. Furthermore, any reflections due to small errors in impedance matching cannot reflect back into the delay line driving source.

Also, the two separate settings on the delay line taps do not interfere with each other since one of the tap selectors 66 or 68 is isolated from the driving circuit through a reverse biased diode 62 or 64. This obviates the necessity of utilizing additional emitter followers for isolation as in the prior art.

Furthermore, circuits in accordance with the invention provide an economical gating arrangement for the reproduced signals without introducing signal distortion due to gating. Previously, emitter followers were connected to receive the signals from the delay line taps, and subsequent gating of the outputs from the emitter followers tended to degrade the signal and create large transient disturbances when switched from one direction to the other. In contrast with the previous circuits wherein the transient blocked subsequent amplifier stages for an excessive time, a short recovery time is inherent in circuits according to the invention due to the fact that only a very small DC change is introduced into the delay line upon switching. In other words, the DC potential level at the delay line taps does not change substantially when the direction is changed.

While there have been described above and illustrated in the drawings various forms of a system employing preamplifying, deskewing and selection circuits in accordance with the invention, it will be appreciated that many other modifications, variations, and alternative forms are possible. Accordingly, the invention should be considered to include all exemplifications falling within the terms of the appended claims.

What is claimed is:

1. A circuit for eliminating static skew effects from signals reproduced from a bidirectionally driven magnetic tape transport mechanism, comprising: preamplifier means for amplifying the reproduced signals; delay line means including a pair of individual variably positioned tap means, both of the tap means being coupled to receive signals from the preamplifier means, the delay line means including a single output terminal; and gating means controllable in accordance with the direction of movement of the tape and coupled to the pair of tap means for providing the signals from the preamplifier means to one of the two tap means in accordance with the direction of travel.

2. A circuit for adjusting the time relation of a given pulse to other nominally time coincident pulses provided from a data reproducer, the data reproducer operating bidirectionally to provide different lead-lag relationships between the nominally parallel pulses, comprising: delay line means having an output terminal and an impedance matching termination at opposite ends and a number of tap points intermediate the output terminal and the impedance matching termination; a pair of individual tap point selection means, each coupling pulses to be adjusted in time to a selected tap point of the delay line means; and gating means coupled to the pair of tap selection means responsive to the operating direction of the data reproducer for selectively decoupling the pulses from one of the tap selection means.

3. A static deskewing circuit responsive to pulses generated by a magnetic head from a magnetic tape and adjusting the pulses correctly in the time relative to a selected time for either direction of tape movement relative to the head, comprising: first amplifier means responsive to the generated pulses for providing two independent amplified pulse representations; a multi-tapped electrical delay line network having an output terminal and providing a selected total delay; a pair of tap selector means for individually coupling each of the amplified pulse representations from the amplifier means to a selected one of the tap selector means; first gating means coupled to selectively pass one of said amplified signal representations to one of the tap selector means; second gating means coupled to selectively pass the other amplified signal representation to the other tap selector means, said first and second gating means being responsive to the forward and reverse direction of tape travel to pass a selected one of the signal representations; and an output circuit coupled to the output terminal of the delay line for receiving the delayed amplified signal representations.

4. A static deskewing circuit responsive to pulses generated by a multi-head magnetic transducer from a magnetic tape adjusting the pulses in turn such that pulses from each head of the transducer are reproduced in time coincidence for both directions despite misalignment, circuit comprising: a multi-tapped electrical delay line network having an output terminal and providing a selected total delay; first and second tap selector means coupling input pulses to two different selected taps of the electrical delay line network; first and second gating means, each including a diode which is forward biased in the absence of a command signal to couple input pulses to one of the first or second tap selector means; means responsive to forward and reverse direction of the tape to provide command signals to back bias one of the diodes to prevent the passage of input signals therethrough; a differential amplifier coupled to receive the delayed input signals from the output terminal of the electrical delay line network; and selector means for selectively biasing the differential amplifier to cut off to provide for the selective operation of the deskewing circuit.

5. A bidirectional tape transport system for reproducing multi-channel digital data with minimization of static skew effects comprising the combination of bidirectional tape driving means, multi-channel signal reproducing means in operative relationship to the tape, multi-channel preamplifier means coupled to receive signals in the separate channels from the reproducing means, a plurality of individual delay lines each having an output terminal and an impedance matching termination at opposing ends, each delay line coupled to receive signals from a different one of the preamplifiers, each of the delay lines having a pair of tap selectors for delivering signals to one of two selected taps of the delay line, a plurality of switching means, each of the switching means being associated with a different one of the delay lines to select one of the two tap selector means to deliver the signals to one of the two selected taps on the delay line, each of said switching means being responsive to the direction of movement of the tape relative to the reproducing means for operating the gating means to deliver the signals to one of the pair of tap selector means and uncouple the signals from the other of the tap selector means.

6. A system for providing substantially uniform digital data pulses subject to static skew within each of a number of signal channels, the system providing forward and reverse control signals, each channel comprising preamplifier means coupled to receive the reproduced digital data pulses and provide a pair of output signal representations; delay line means having selectable tap positions disposed along the delay line means between a termination and an output terminal; a pair of tap selector means for selecting two tap positions on either side of a midpoint position to correspond to the amount and sense of the static skew effects in the channels; gating means coupling each signal representation from the preamplifier means to an associated tap selector means; a normally reverse-biased transistor difference amplifier coupled to receive the delayed signal representations from the output terminal of the delay line means; and means for providing forward, reverse and channel selection signals, said gating means being responsive to the forward and reverse control signals to selectively couple one of the signal representations to one of the tap selector means and decouple the other tap selector means, and said normally reverse-biased difference amplifier being responsive to the selection control signal to become forward-biased, whereby a selected one of the two deskewing delays may be obtained in each channel in accordance with a forward or a reverse direction of static skew.

7. A system for providing substantially, time-coincident digital data pulses from pulses subject to static skew which are reproduced within each of a number of signal channels, the system providing forward and reverse control signals, and comprising for each channel: preamplifier means coupled to receive the reproduced digital data pulses in the channel and provide a pair of output signal representations; delay line means having intermediate selectable tap positions disposed along the length of the delay line means between an impedance matching termination and an output terminal at opposing ends; a pair of intermediate tap selector means for selecting either of two tap positions on either side of a midpoint position to correspond to the amount and sense of the static skew effects in the channels; a pair of signal gating means coupling each signal representation from the preamplifier means to an associated tap selector means, each of the signal gating means including a separate transistor current source of virtually infinite impedance coupled to the associated tap selector means through a normally reverse-biased diode; a normally reverse-biased transistor difference amplifier coupled to receive the delayed signal representations from the output terminal of the delay line means; and means for providing forward, reverse and channel selection signals, said gating means being responsive to the forward and reverse control signals to selectively couple one of the signal representations to one of the tap selector means, such that the associated diode becomes forward biased, and the diode coupled to the other tap selector means remains reverse-biased, and said normally reverse-biased difference amplifier being responsive to the selection control signal to become forward-biased, whereby a selected one of the two deskewing delays may be obtained in each channel in accordance with a forward or a reverse direction of static skew.

References Cited

UNITED STATES PATENTS

| | | | |
|---|---|---|---|
| 2,842,756 | 7/1958 | Johnson | 340—174.1 |
| 3,275,990 | 9/1966 | Mendenhall et al. | 340—172.5 |

BERNARD KONICK, *Primary Examiner.*

V. P. CANNEY, *Assistant Examiner.*